United States Patent
Erta et al.

(10) Patent No.: US 11,405,133 B1
(45) Date of Patent: Aug. 2, 2022

(54) NETWORK LAYER FEC IN WIRELESS NETWORKS

(71) Applicant: Cisco Technology, Inc., San Jose, CA (US)

(72) Inventors: Alessandro Erta, Licciana Nardi (IT); Rupak Chandra, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/208,237

(22) Filed: Mar. 22, 2021

(51) Int. Cl.
*H04L 1/00* (2006.01)
(52) U.S. Cl.
CPC .................. *H04L 1/0041* (2013.01)
(58) Field of Classification Search
CPC ... H04L 1/0041; H04L 1/0004; H04L 1/0005; H04L 1/0072; H04L 1/0042; H04L 1/06; H04W 28/0231; H04W 28/0236
See application file for complete search history.

(56) References Cited

U.S. PATENT DOCUMENTS

| | | | |
|---|---|---|---|
| 6,557,142 B2 | 4/2003 | Morris et al. | |
| 7,940,777 B2 | 5/2011 | Asati et al. | |
| 8,402,350 B2 | 3/2013 | Fang et al. | |
| 9,215,747 B2 * | 12/2015 | Lee | H04W 72/0446 |
| 9,843,413 B2 | 12/2017 | Badr et al. | |
| 2005/0009523 A1 | 1/2005 | Pekonen | |
| 2009/0003216 A1 * | 1/2009 | Radunovic | H04W 28/0231 370/237 |
| 2013/0275837 A1 | 10/2013 | Heath et al. | |

OTHER PUBLICATIONS

Zhuoqun et al., An improved MPTCP in coded wireless mesh networks, IEEE, pp. 795 to 799 (Year: 2009).*
Li et al., Error recovery based on FEC in network-layer for Intermittently connected mobile networks, IEEE, pp. 1 to 6. (Year: 2010).*
"Taking Forward Error Correction (FEC) to the Next Level", online: https://www.silver-peak.com/sites/default/files/infoctr/silver-peak_wp_fec.pdf, White Paper, Apr. 30, 2006, 5 pages, Silver Peak Systems, Inc.
"Forward Error Correction (FEC)", online: https://www.tutorialspoint.com/forward-error-correction-fec, accessed Mar. 9, 2021, 1 page.
Kulkarni, et al., "Forward Error Correction based Encoding Technique for Cross-layer Multi Channel MAC Protocol", Energy Procedia 117 (2017), Mar. 2017, pp. 847-854, Elsevier.

(Continued)

*Primary Examiner* — Shelly A Chase
(74) *Attorney, Agent, or Firm* — Behmke Innovation Group; Kenneth J. Heywood; Jonathon P. Western

(57) ABSTRACT

In one embodiment, a controller obtains a stream of data packets. The controller applies network-layer forward error correction encoding to the stream of data packets, to form one or more encoded packets. The controller causes the stream of data packets to be sent via a link in a wireless network between a first radio of a node in the wireless network and a first access point to which the first radio is wirelessly connected. The controller causes the one or more encoded packets to be sent between a second radio of the node and a second access point in the wireless network.

20 Claims, 6 Drawing Sheets

(56) References Cited

OTHER PUBLICATIONS

"Wi-Fi: Overview of the 802.11 Physical Layer and Transmitter Measurements", online: www.tektronix.com/wifi, Nov. 2013, 44 pages.
Murphy, Rick, "Understanding OFDM—Part 3—Refresh", online: https://www.wirelesstrainingsolutions.com/understanding-ofdm-part-3-refresh/, Oct. 2016, accessed Mar. 9, 2021, 15 pages, Wireless Training & Solutions.
Chen, Xiaomin, "Coding in 802.11 WLANs", Doctor of Philosophy Dissertation, Hamilton Institute, National University of Ireland Maynooth, Sep. 2012, 120 pages, Ireland.
Riemann, et al., "Improving 802.11 Range with Forward Error Correction", Technical Report, MIT-C, SAIL-TR-2005-011, Dec. 2005, 6 pages, Massachusetts Institute of Technology.
Choi, Sunghyun, "IEEE 802.11E MAC-Level FEC Performance Evaluation and Enhancement", Global Telecommunications Conference, 2002. GLOBECOM '02. IEEE, Nov. 2002, 5 pages, IEEE.
"Error Correction Code", online: https://en.wikipedia.org/wiki/Error_correction_code, Feb. 2021, 9 pages, Wikimedia Foundation, Inc.

\* cited by examiner

NETWORK LAYER FEC IN WIRELESS NETWORKS

TECHNICAL FIELD

The present disclosure relates generally to computer networks, and, more particularly, to using forward error correction (FEC) at the network layer in wireless networks.

BACKGROUND

As wireless access points become increasingly ubiquitous, more and more access points are being deployed in non-traditional settings, such as industrial and transportation settings. For instance, some mines now rely on wireless network deployments to monitor the mining process and the fleet of vehicles moving throughout a mine. This allows the operator of the mine to quickly identify problems, such as a broken down truck or other issues that may arise. Similarly, factory and warehouse operators are increasingly relying on wireless networks to control their devices, such as mobile robots, sensors and actuators, and the like.

In contrast to wireless networks deployed to traditional locations (e.g., office buildings, schools, etc.), non-traditional wireless network deployments may be subject to various conditions that can affect the radio frequency (RF) signals in the area. For instance, the high presence of metal in a mine could lead to severe signal degradation and blockage. In addition, nodes in these networks (e.g., trucks, trains, etc.) may be highly dynamic as they move throughout the area. This can also lead to signal fading and congestion due to interference. In extreme cases, the environmental factors can impinge on the wireless communications to such a degree that the controlled process is interrupted. Indeed, if a controlled node is unable to communicate with the wireless network, that node will be unable to receive control commands or report data back to its supervisory service.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
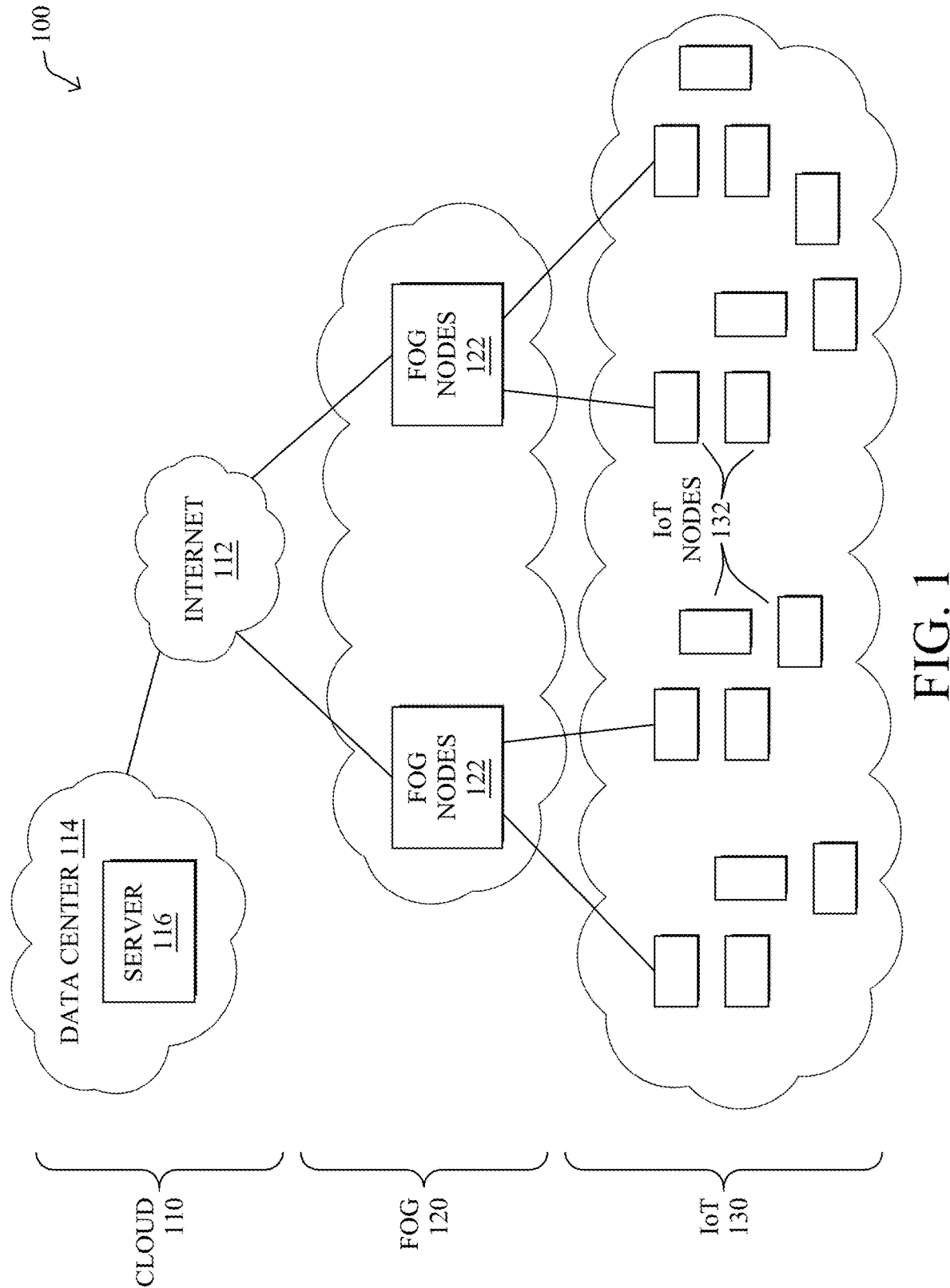
FIG. 1 illustrate an example computer network.

According to one or more embodiments of the disclosure, a controller obtains a stream of data packets. The controller applies network-layer forward error correction encoding to the stream of data packets, to form one or more encoded packets. The controller causes the stream of data packets to be sent via a link in a wireless network between a first radio of a node in the wireless network and a first access point to which the first radio is wirelessly connected. The controller causes the one or more encoded packets to be sent between a second radio of the node and a second access point in the wireless network.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely a cloud layer 110, a fog layer 120, and an IoT device layer 130. Illustratively, cloud layer 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
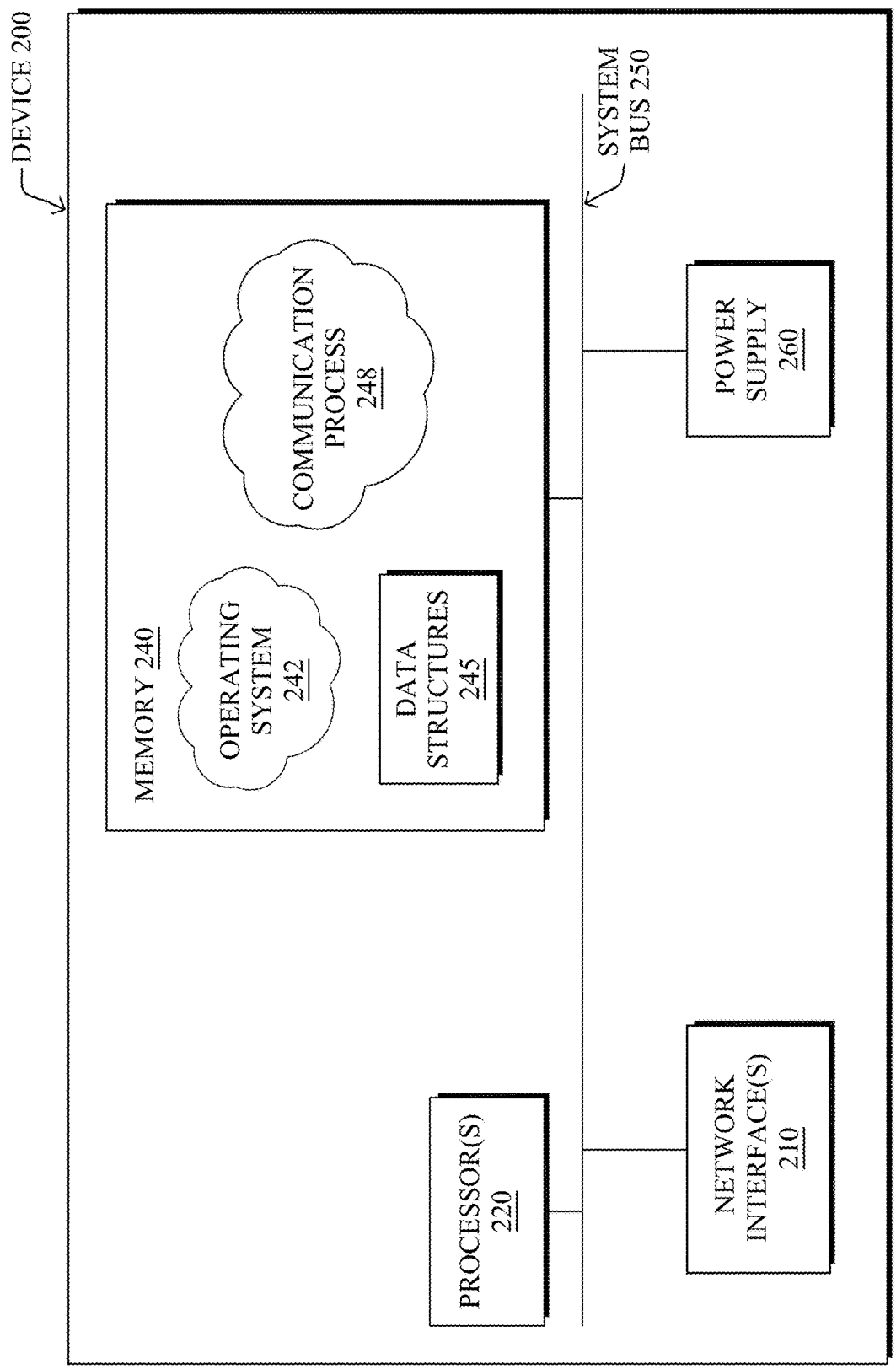
FIG. 2 illustrates an example network device/node.

FIG. 2 is a schematic block diagram of an example node/device 200 (e.g., an apparatus) that may be used with one or more embodiments described herein, e.g., as any of the nodes or devices shown in FIG. 1 above or described in further detail below. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/

IP, UDP, etc. Note that the device 200 may have multiple different types of network connections, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative communication process 248, as described herein. Note that while communication process 248 is shown in centralized memory 240 alternative embodiments provide for the process to be specifically operated within the network interface(s) 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 3:
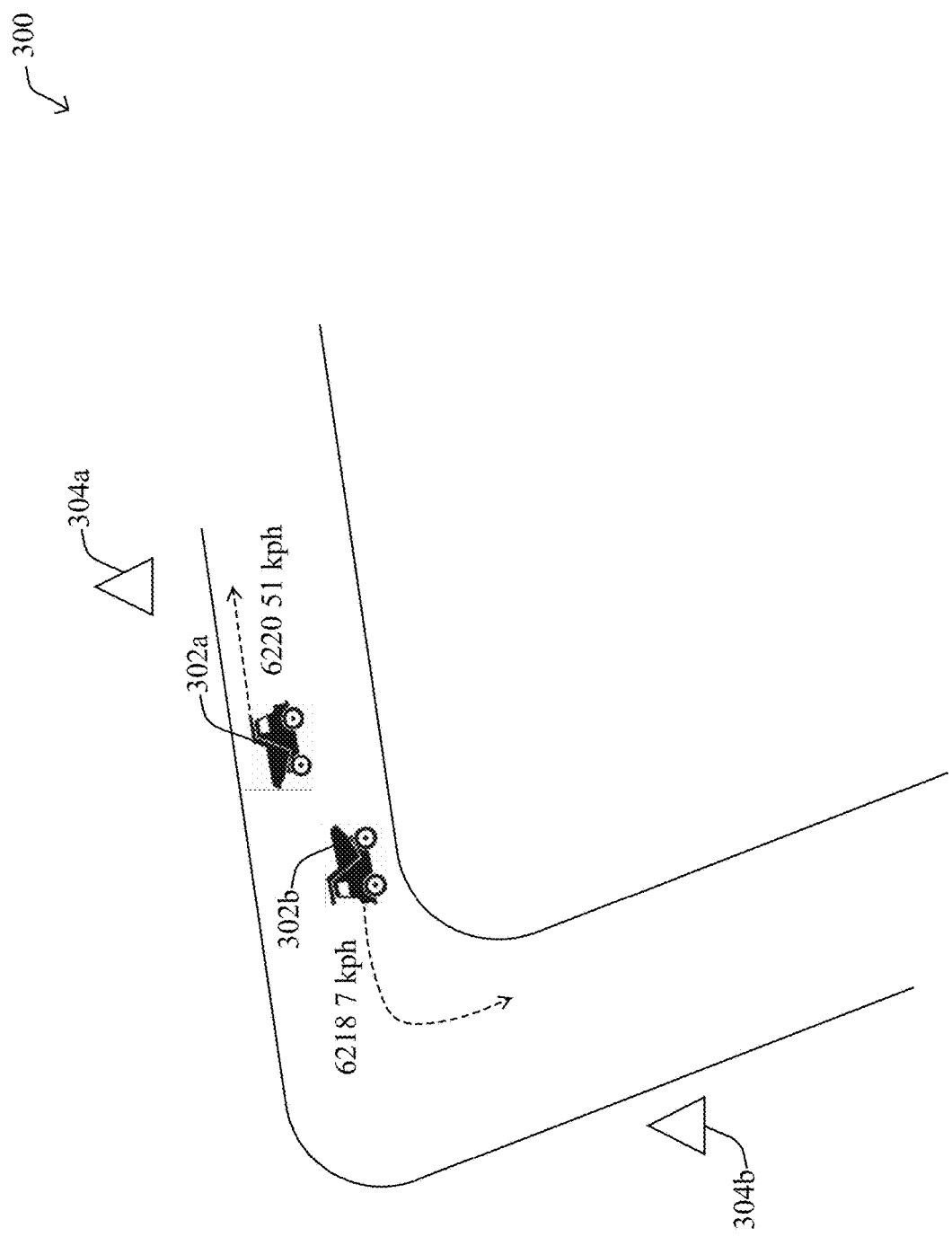
FIG. 3 illustrates an example industrial wireless network deployed in a mine.

As noted above, many IoT networks are implemented as wireless meshes. For instance, FIG. 3 illustrates an example industrial network 300. As shown, a number of vehicles 302*a*-302*b* may be deployed to the location of industrial network 300. For example, if the deployment location of industrial network 300 is a mine, vehicles 302*a*-302*b* may be autonomous trucks or carts. Each of vehicles 302*a*-302*b* may include its own hardwired network, such as a Controller Area Network (CAN) Bus, Ethernet, or the like, that allow the various components of the vehicle to communicate with one another. For example, a plurality of sensors on vehicle 302*a* may send sensor readings to an onboard navigation system that controls the steering and acceleration of vehicle 302*a* within the deployment location of wireless network 300 via a local, hardwired network of vehicle 302*a*.

Distributed throughout the deployment location of wireless network 300 may be any number of wireless access points 304, such as wireless access points 304*a*-304*b*, that form a wireless mesh network. In some embodiments, the access points 304 may be autonomous access points that self-organize into a wireless mesh. For example, certain access points 304 may function as mesh access points (MAPs) and arrange themselves into a wireless mesh rooted at a root access point (RAP). In alternative deployments, access points 304*a*-304*b* may be connected to one another, and/or a supervisory device, via a hardwired network backend.

Preferably, each of the mobile nodes in wireless network 300, such as vehicles 302*a*-302*b*, may include a plurality of radios/transceivers. This allows a particular vehicle 302 to attach/associate to a particular access point 304 using a first one of its radios/transceivers over a certain wireless channel (e.g., form a link with that access point). In addition, the additional radio(s) of the vehicle 302 may also form links with the same access point 304 on a different channel and/or with one or more other access points 304. For instance, as shown, vehicle 302*b* may communicate with access point 304*a* using a first radio and may also communicate with access point 304*b* using a different radio. Doing so affords vehicle 302*b* multiple communication paths to the backend infrastructure through the use of spatially diverse access points 304.

The process by which a vehicle 302 detaches from an access point 304 and attaches to a different access point 304 is known as roaming. This process may be repeated any number of times, as a vehicle 302 moves throughout the area. Typically, the decision to roam from the current access point 304 being used by a vehicle 302 to another access point 304 is made by comparing the radio signal quality metrics for the access points to one or more roaming thresholds. Notably, if the received signal strength indicator (RSSI), signal-to-noise (SNR) ratio, or the like, crosses the roaming threshold, the vehicle 302 may roam to another access point 304. For example, as vehicle 302*b* moves away from access point 304*a*, its measured RSSI with access point 304*a* may drop below the defined roaming threshold, leading vehicle 302*b* to roam to another access point 304, such as access point 304*b*.

Figure 4:
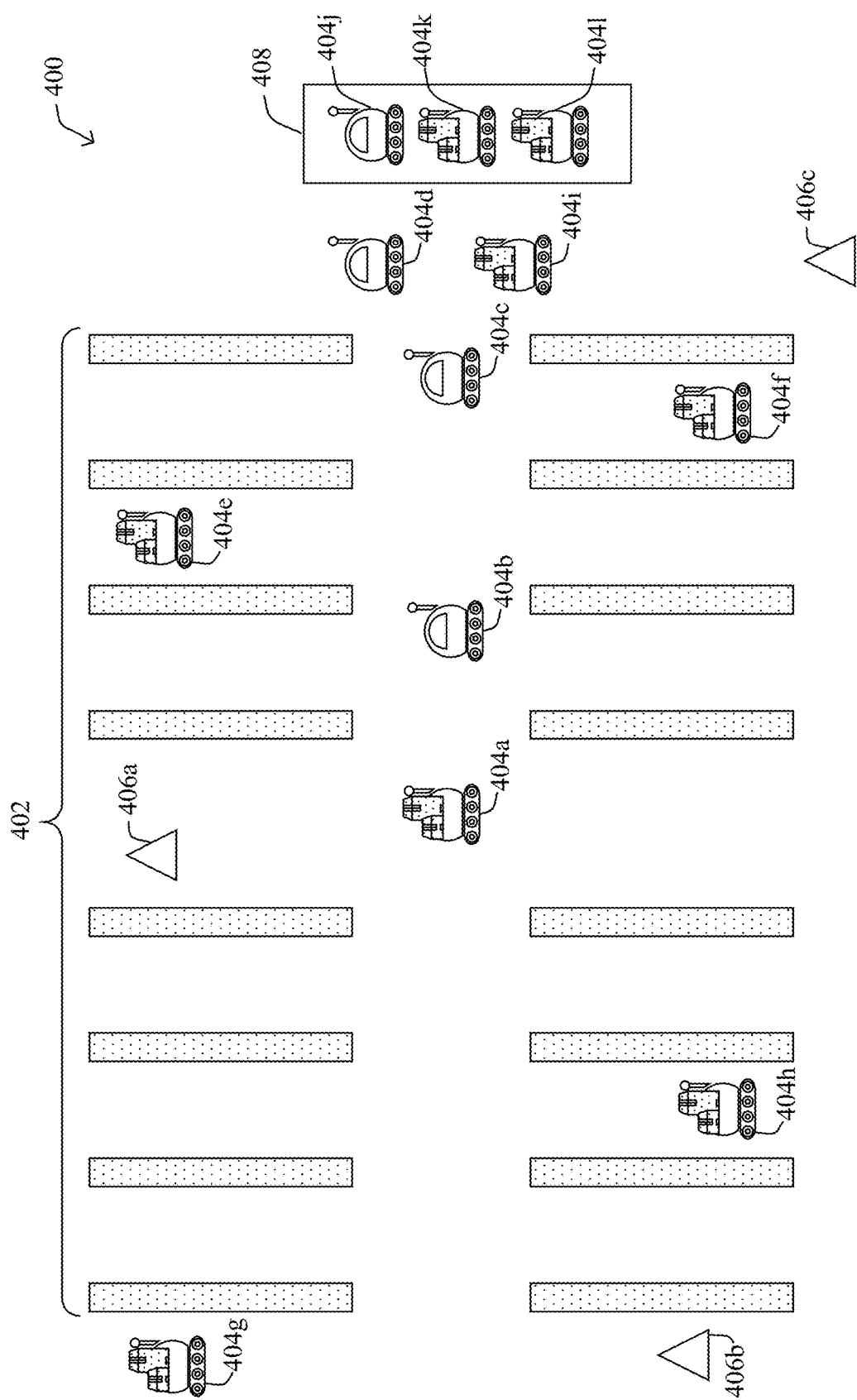
FIG. 4 illustrates an example industrial wireless network deployed in a warehouse.

FIG. 4 illustrates another example warehouse 400 deployed in a warehouse, in various embodiments. As shown, assume that a plurality of inventory racks 402 are distributed throughout warehouse 400 is located for purposes of storing items. As would be appreciated, inventory racks 402 are optional and other forms of storage systems may be deployed throughout warehouse 400, in other cases. For instance, warehouse 400 may also include containers, holding pens, or the like, in which various items may be stored.

To aid in the storage and/or retrieval of the items in the warehouse, any number of mobile robots 404 may be deployed, such as mobile robots 402*a*-404*l* shown. In general, each mobile robot 404 may include a propulsion system that propels the robot (e.g., an engine coupled to wheels, treads, etc.), one or more sensor systems (e.g., infrared, sonar, video, etc.), a communication system (e.g., wireless, hardwired port, etc.), and a computer control system coupled to the other systems that provides supervisory control over the other systems. In some embodiments, mobile robots 404 may also include mechanisms to automatically load and/or unload items, such as forklifts, mechanical claws, or the like. In other embodiments, mobile robots 404 may require the assistance of human workers to load and unload items to and from them, such as at a pack-out area 408.

In some instances, mobile robots 404 may be partially or fully autonomous, allowing them to complete their tasks, independently. For instance, a particular mobile robot 404 may be sent a task list that indicates the set of items that the robot is to retrieve from within warehouse 400, navigation information if so needed, or any other information that may be required for the performance of its retrieval functions. To this end, warehouse 400 may also include a wireless network that comprises access points 406, such as access points 406*a*-406*c*.

Similar to the example in FIG. 3, each mobile robot 404 in FIG. 4 may include a plurality of radios/transceivers, thereby allowing them to communicate with multiple access points 406 (or different radios of the same access point). This allows a given mobile robot 404 to leverage multiple communication paths with the backend infrastructure.

As noted above, non-traditional deployment locations for wireless networks, such as in the examples of FIGS. 3-4, typically experience conditions that are not present in more traditional locations, such as office buildings, schools, etc. Indeed, non-traditional wireless network deployments may be subject to various conditions that can affect the radio frequency (RF) signals in the area. For instance, the high presence of metal in a mine could lead to severe signal degradation and blockage. In addition, nodes in these networks (e.g., trucks, trains, etc.) may be highly dynamic as they move throughout the area. This can also lead to signal fading and congestion due to interference. In extreme cases, the environmental factors can impinge on the wireless communications to such a degree that the controlled process is interrupted. Indeed, if a controlled node is unable to communicate with the wireless network, that node will be unable to receive control commands or report data back to its supervisory service.

Of course, the non-traditional environments in FIGS. 3-4 are exemplary only and the techniques introduced herein may be applied to any number of other forms of network deployments. For instance, the techniques herein may be used within other non-traditional deployment locations, such as railways, roadways, runways, factories, and the like, where RF conditions may compromise the reliability of the network, as well as in traditional deployment locations, as desired.

Forward error correction (FEC) encoding is a mechanism that can help to mitigate the effects of losses during communication. Generally speaking, FEC encoding operates by adding redundant information into the stream of data for a message. As a result, the entirety of the message can be reconstructed at the receiver side, even if part of the stream is lost during transmission. Example FEC encoding approaches include block codes, which are applied to blocks of bits or symbols of fixed sizes (e.g., packets, etc.), and convolutional codes, which work on streams of bits or symbols of arbitrary length.

Typically, FEC encoding is applied to wireless communications at the physical (PHY)-layer of the Open Systems Interconnection (OSI) model. As would be appreciated, the OSI model generally includes the following layers:
Layer 1: Physical (PHY) Layer
Layer 2: Data Link Layer
Layer 3: Network Layer
Layer 4: Transport Layer
Layer 5: Session Layer
Layer 6: Presentation Layer
Layer 7: Application Layer Network Layer FEC in Wireless Networks The techniques herein introduce a network-layer FEC encoding mechanism, to improve the reliability of wireless communications in a network, particularly those in non-traditional wireless networks with mobile nodes. Such network-layer FEC encoding may be performed in conjunction with any FEC encoding applied at a lower layer, such as at the PHY or data link layer, in some embodiments.

Illustratively, the techniques described herein may be performed by hardware, software, and/or firmware, such as in accordance with the communication process 248, which may include computer executable instructions executed by the processor 220 (or independent processor of interfaces 210) to perform functions relating to the techniques described herein.

Specifically, according to various embodiments, a controller obtains a stream of data packets. The controller applies network-layer forward error correction encoding to the stream of data packets, to form one or more encoded packets. The controller causes the stream of data packets to be sent via a link in a wireless network between a first radio of a node in the wireless network and a first access point to which the first radio is wirelessly connected. The controller causes the one or more encoded packets to be sent between a second radio of the node and a second access point in the wireless network.

Figure 5:
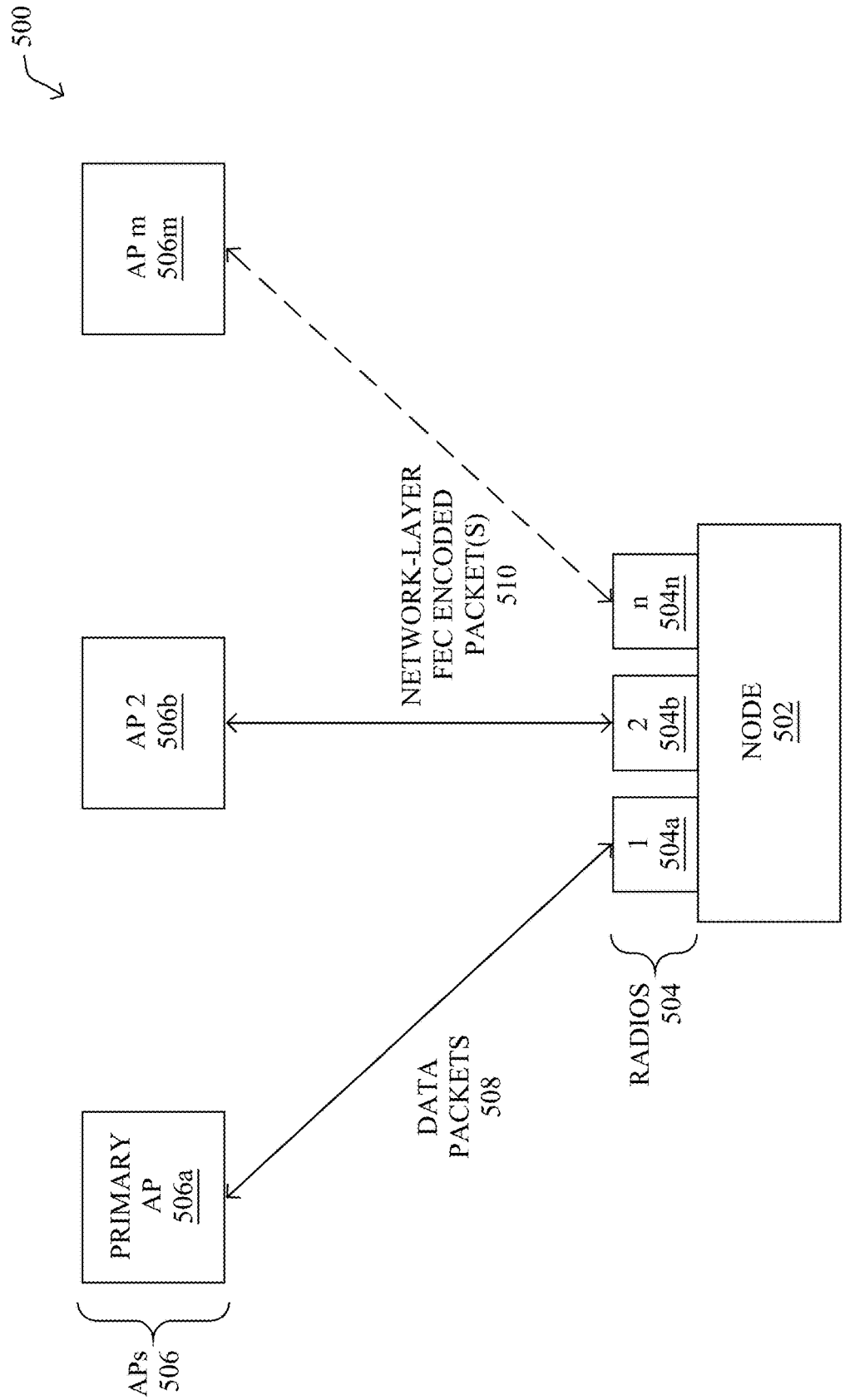
FIG. 5 illustrates an example of using network-layer forward error correction (FEC) encoding to communicate in a wireless network.

Operationally, FIG. 5 illustrates an example of using network-layer forward error correction (FEC) encoding to communicate in a wireless network 500, according to various embodiments. As shown, assume that there is a node 502, such as one of the mobile nodes shown in FIGS. 3-4 or any other node/client of wireless network 500, that comprises a plurality of radios 504 (e.g., a $1^{st}$ through $n^{th}$ radio). In addition, assume that the infrastructure of wireless network 500 includes access points (APs) 506 (e.g., a $1^{st}$ through $m^{th}$ AP). Depending on the location of node 502, its movement (if any), and the locations of APs 506, node 502 may be within communication range of any or all of APs 506 shown.

For purposes of illustration of the techniques herein, assume that a first radio 504a within radios 504 of node 502 is wirelessly connected to a primary AP 506a within APs 506. Typically, this association may be made in part based on the RSSI, SNR, or other RF characteristics measured between radio 504a and AP 506a. For instance, AP 506a may periodically send out beacons that announce its presence to any nodes within range. In turn, a receiving node, such as node 502, may assess the RF or other characteristics of that beacon and respond with an association request, to associate radio 504a with AP 506a.

Now, assume that there is a stream of data packets 508 that are to be conveyed between AP 506a and radio 504a, such as control commands for an actuator, telemetry data from one or more sensor(s), or other forms of data packets 508. Even if FEC encoding is applied at the physical-layer during transmission, there is no guarantee that the entire stream of data packets 508 will be received by their intended receiver (e.g., either AP 506a, if sent by node 502, or by radio 504a, if sent by AP 506a) and be recoverable in its entirety.

According to various embodiments, the techniques herein propose that a controller located on either side of the communication link apply network-layer FEC encoding to the data packets 508, prior to transmission. For instance, such a controller may be located onboard node 502, as in the case in which node 502 is to send the stream of data packets 508 to an AP in APs 506. In other cases, the controller may be located on the infrastructure side of wireless network 500, such as part of a particular AP in APs 506 or in communication with one or more of APs 506 (e.g., as part of an AP controller, gateway, etc.), as in the case in which the stream of data packets 508 are to be sent to node 502. Preferably, both sides of the communication include their own controllers for purposes of applying the network-layer FEC encoding to any packets for transmission.

As a result of the application of the network-layer FEC encoding, one or more encoded packets 510 will be generated. In general, the encoded packet(s) 510 may include redundant information from the original set of data packets 508 that can be used to recover/reconstruct any of the data packets 508, should they be lost during transmission. If the entire stream of data packets 508 is received correctly, the receiver may simply discard the encoded packet(s) 510 as extraneous. To this end, each of data packets 508 and encoded packet(s) 510 may include identification information that associate the packets with one another and allow the receiver to track their status. For instance, data packets 508 may include sequence numbers that the receiver can use to determine whether any of data packets 508 are lost in transmission.

According to various embodiments, the amount of network-layer FEC encoding used to generate encoded packet(s) 510 may be variable in nature. Indeed, the greater the degree of encoding used, the greater the amount of encoded packet(s) 510 that will be generated and will need to be sent. In some embodiments, the amount of network-layer FEC encoding may be based in part on the number of alternate paths available between the sender and receiver and/or the quality of such paths (e.g., based on their respective RSSI measurements, SNR measurements, historical or predicted measurements, etc.). In further embodiments, the amount of network-layer FEC encoding applied to data packets 508 may be a function of the type of data packets 508, such as based on their associated application, a traffic priority, or the like. Indeed, protecting control commands or other critical data against loss may be of greater concern than that of lower priority data.

As would be appreciated, any application of network-layer FEC encoding to the stream of data packets 508 will result in a greater number of packets to be transmitted to the receiver (e.g., the number of data packets 508 plus the number of encoded packet(s) 510 that were generated). In a simplistic case, the encoded packet(s) 510 may simply be included as part of the transmitted stream of data packets 508 (e.g., between radio 504a and AP 506a). However, doing so would also increases the utilization of the link, which may already be constrained due to the present RF conditions, the motion of node 502, etc.

In various embodiments, the techniques herein propose leveraging the alternative path(s) available between APs 506 and node 502, for purposes of conveying the network-layer FEC encoded packet(s) 510 for the stream of data packets 508. In other words, rather than simply sending encoded packet(s) 510 with data packets 508 over the same connection/link, encoded packet(s) 510 may be sent over different paths. By doing so, this can help reduce the overhead on the link used to convey data packets 508, while also potentially providing spatial or channel diversity to the conveyance of encoded packet(s) 510.

By way of example, assume radio 504a is currently associated with AP 506a, which is referred to as the primary AP. In such a case, the stream of data packets 508 may be sent between radio 504a and AP 506a, after data packets 508 are used to generate encoded packet(s) 510. In turn, encoded packet(s) 510 may be sent between AP 506b and radio 504b of node 502, if the two are in communication range of one another. In some embodiments, AP 506b and radio 504b may not even be associated with one another. For instance, assume that encoded packet(s) 510 are to be sent to node 502. In such a case, AP 506b may send encoded packet(s) 510 via beaconing, with radio 504b being configured to listen for these communications.

In more complex scenarios, encoded packet(s) 510 may be sent via a plurality of different paths than that of the stream of data packets 508. For instance, encoded packet(s) 510 may be sent by AP 506b, AP 506m, etc., or by radio 504b, radio 504n, etc., depending on the number of radios 504 onboard node 502 and the number of APs 506 within communication range of node 502.

Note also that certain deployments may also support different paths between node 502 and AP 506a, as well. For instance, assume that AP 506a includes multiple radios. In such a case, data packets 508 may be conveyed between a first radio of AP 506a and radio 504a, while encoded packet(s) 510 are conveyed between one or more other radios of AP 506a and radio(s) 504b-504n of node 502. Doing so does not afford the same spatial diversity as in the multiple AP case, but still prevents encoded packet(s) 510 from impinging on the link/path via which data packets 508 are sent.

As noted, once the receiver has received data packets 508, or a subset thereof, and encoded packet(s) 510, the receiver may use encoded packet(s) 510 to reconstruct any of data packets 508 that were lost during transmission. This process can be achieved by applying FEC decoding to the packets that were received. Note that the network-layer FEC encoding and decoding may be performed in addition to any other FEC encoding performed at other layers (e.g., PHY layer, link layer, etc.) that may be used, as well.

Figure 6:
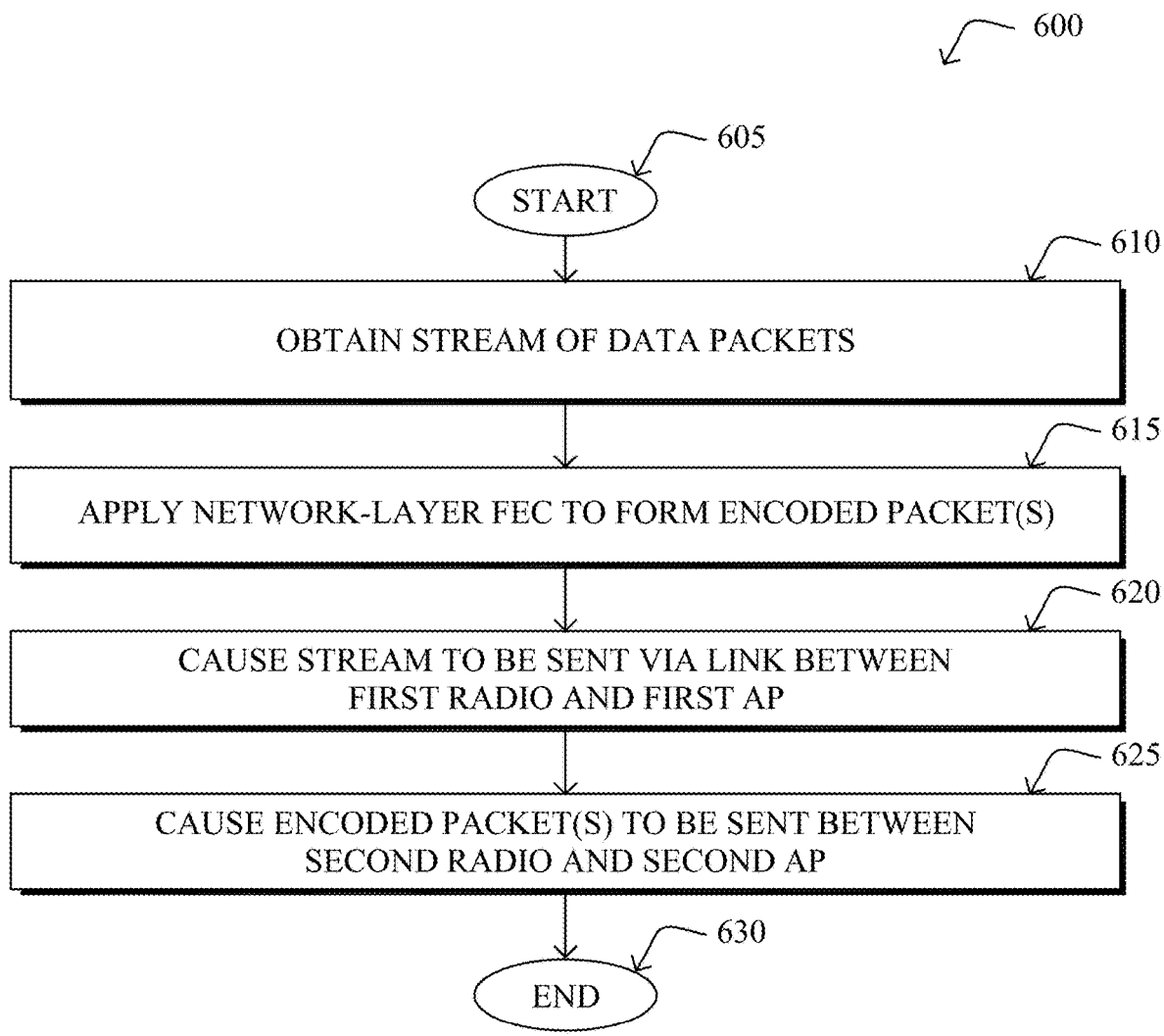
FIG. 6 illustrates an example simplified procedure for using network-layer FEC encoding to communicate in a wireless network.

FIG. 6 illustrates an example simplified procedure for using network-layer FEC encoding to communicate in a wireless network, in accordance with one or more embodiments described herein. The procedure 600 may start at step 605, and continues to step 610, where, as described in greater detail above, a device in a network (e.g., device 200), a controller (e.g., a device 200) may obtain a stream of data packets. For instance, the controller may be a component of a node in a wireless network (e.g., a mobile node, such as a robot, vehicle, etc.), an access point in the wireless network, or another device in communication therewith.

At step 615, as detailed above, the controller may apply network-layer FEC encoding to the stream of data packets, to form one or more encoded packets. For instance, the controller may apply block or convolutional coding to the packets in the stream, to generate redundant information from which the stream of packets could be reconstructed. For instance, if a particular packet in the stream is lost during transmission, the encoded packet(s) may be such that the dropped packet can be reconstructed, thereby protecting the stream against transmission loss. In some embodiments, physical-layer FEC encoding may also be applied to the stream of data packets, prior to their transmission, such as in accordance with an 802.11 protocol or the like.

At step 620, the controller may cause the stream of packets to be sent via a link in the wireless network between a first radio of a node and a first access point to which the first radio is wirelessly connected, as described in greater detail above. Indeed, in various embodiments, the node may comprise any number of radios, at least one of which is wirelessly connected to the first access point in the wireless network (e.g., via a primary link). For instance, the stream of data packets may comprise a control command for an actuator, telemetry data from one or more sensors, or the like.

At step 625, as detailed above, the controller may cause the one or more encoded packets to be sent between a second radio of the node and a second access point in the wireless network. In some embodiments, the encoded packet(s) may be sent as beacons by the second access point. In further embodiments, the second radio is not attached to the second access point (e.g., the second radio has not established itself as a client of that access point). In cases in which the controller is at the infrastructure end of the network, causing the encoded packet(s) to be sent between the second radio and the second access point may entail sending the encoded packet(s) to the second access point for transmission to the node. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, ensure the reliability of wireless communications in a wireless network through the use of network-layer FEC encoding. In doing so, packets lost during transmission can be reconstructed using the redundant information generated by the network-layer FEC encoding. In addition, the techniques herein do not impose additional bandwidth constraints on the primary link between a node and the infrastructure by transmitting the redundant information over a different channel and leveraging a different radio of the node than the radio used for its primary link. In cases in which the redundant information is conveyed to a different access point than that of the primary link, this can also add spatial and/or channel diversity to is conveyance, thereby helping to ensure that at least the redundant information is received at its destination.

While there have been shown and described illustrative embodiments for using network-layer FEC encoding a wireless network, it is to be understood that various other adaptations and modifications may be made within the intent and scope of the embodiments herein. For example, while the techniques herein are described with respect to certain types of wireless networks, the techniques herein are not limited as such and can be used in any other form of wireless network, as desired. Further, while certain protocols are used herein for illustrative purposes, the techniques herein can also be implemented using other suitable protocols, as well.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
  obtaining, by a controller, a stream of data packets;
  applying, by the controller, network-layer forward error correction encoding to the stream of data packets, to form one or more encoded packets;
  causing, by the controller, the stream of data packets to be sent via a link in a wireless network between a first radio of a node in the wireless network and a first access point to which the first radio is wirelessly connected; and
  causing, by the controller, the one or more encoded packets to be sent between a second radio of the node and a second access point in the wireless network.

2. The method as in claim 1, wherein the one or more encoded packets are used to reconstruct a data packet in the stream of data packets that was lost during transmission between the first radio and the first access point.

3. The method as in claim 1, wherein the node comprises the controller.

4. The method as in claim 1, wherein the node is a mobile node in the wireless network.

5. The method as in claim 1, wherein the one or more encoded packets are sent as beacons by the second access point.

6. The method as in claim 1, further comprising:
  causing, by the controller, the one or more encoded packets to be sent between the second radio of the node and a third access point in the wireless network.

7. The method as in claim 1, wherein causing the one or more encoded packets to be sent between the second radio of the node and the second access point in the wireless network comprises:
  sending the one or more encoded packets to the second access point for transmission to the node.

8. The method as in claim 1, wherein the second radio is not associated with the second access point.

9. The method as in claim 1, further comprising:
  applying physical-layer forward error correction encoding to the stream of data packets, prior to transmission of the stream of data packets.

10. The method as in claim 1, wherein the stream of data packets comprises a control command for an actuator or telemetry data from one or more sensors.

11. An apparatus, comprising:
  one or more network interfaces;
  a processor coupled to the one or more network interfaces and configured to execute one or more processes; and
  a memory configured to store a process that is executable by the processor, the process when executed configured to:
    obtain a stream of data packets;
    apply network-layer forward error correction encoding to the stream of data packets, to form one or more encoded packets;
    cause the stream of data packets to be sent via a link in a wireless network between a first radio of a node in the wireless network and a first access point to which the first radio is wirelessly connected; and
    cause the one or more encoded packets to be sent between a second radio of the node and a second access point in the wireless network.

12. The apparatus as in claim 11, wherein the one or more encoded packets are used to reconstruct a data packet in the stream of data packets that was lost during transmission between the first radio and the first access point.

13. The apparatus as in claim 11, wherein the node comprises the apparatus.

14. The apparatus as in claim 11, wherein the node is a mobile node in the wireless network.

15. The apparatus as in claim 11, wherein the one or more encoded packets are sent as beacons by the second access point.

16. The apparatus as in claim 11, wherein the process when executed is further configured to:
  cause the one or more encoded packets to be sent between the second radio of the node and a third access point in the wireless network.

17. The apparatus as in claim 11, wherein the apparatus causes the one or more encoded packets to be sent between the second radio of the node and the second access point in the wireless network by:
sending the one or more encoded packets to the second access point for transmission to the node.

18. The apparatus as in claim 11, wherein the second radio is not associated with the second access point.

19. The apparatus as in claim 11, wherein the process when executed is further configured to:
apply physical-layer forward error correction encoding to the stream of data packets, prior to transmission of the stream of data packets.

20. A tangible, non-transitory, computer-readable medium storing program instructions that cause a controller to execute a process comprising:
obtaining, by the controller, a stream of data packets;
applying, by the controller, network-layer forward error correction encoding to the stream of data packets, to form one or more encoded packets;
causing, by the controller, the stream of data packets to be sent via a link in a wireless network between a first radio of a node in the wireless network and a first access point to which the first radio is wirelessly connected; and
causing, by the controller, the one or more encoded packets to be sent between a second radio of the node and a second access point in the wireless network.

\* \* \* \* \*